United States Patent [19]

Fuëter et al.

[11] Patent Number: 4,606,622
[45] Date of Patent: Aug. 19, 1986

[54] MULTI-FOCAL SPECTACLE LENS WITH A DIOPTRIC POWER VARYING PROGRESSIVELY BETWEEN DIFFERENT ZONES OF VISION

[75] Inventors: Gerhard Fuëter, Ellwangen; Hans Lahres, Aalen, both of Fed. Rep. of Germany

[73] Assignee: Carl-Zeiss-Stiftung, Heidenheim/Brenz, Oberkochen, Fed. Rep. of Germany

[21] Appl. No.: 570,589

[22] Filed: Jan. 13, 1984

Related U.S. Application Data

[63] Continuation-in-part of Ser. No. 258,995, Apr. 30, 1981, abandoned.

[30] Foreign Application Priority Data

May 2, 1980 [DE] Fed. Rep. of Germany ....... 3016935

[51] Int. Cl.⁴ .............................................. G02C 7/06
[52] U.S. Cl. ...................................... 351/169; 351/177
[58] Field of Search ................................ 351/168-172, 351/177

[56] References Cited

U.S. PATENT DOCUMENTS

4,307,945 12/1981 Kitchen et al. ...................... 351/169
4,315,673 2/1982 Guilino et al. ....................... 351/169

*Primary Examiner*—John K. Corbin
*Assistant Examiner*—Scott J. Sugarman
*Attorney, Agent, or Firm*—Hopgood, Calimafde, Kalil, Blaustein & Judlowe

[57] ABSTRACT

The invention contemplates a multi-focal spectacle lens with a dioptric power varying progressively between different zones of vision, namely, a progressive lens which, with a short progressive zone, substantially satisfies in the progressive zone as well as in the far-vision and near-vision zones all requirements (monocular and binocular) for sharpness and compatibility, while reducing horizontal and vertical directional errors to tolerable values by selecting distortion on both sides of the principal sight line accordingly.

23 Claims, 11 Drawing Figures

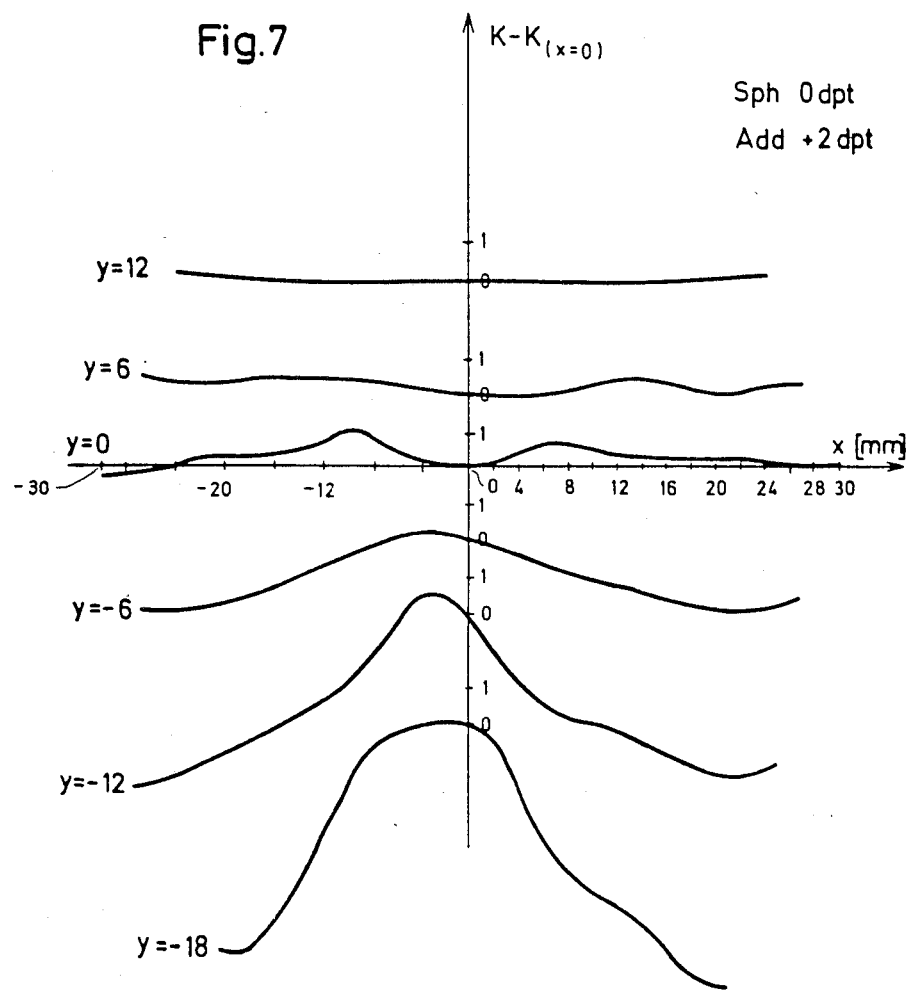

Fig. 8A

Sph 0dpt    Add +2dpt

| mm | -30 | -27 | -24 | -21 | -18 | -15 | -12 | -9 | -6 | -3 | 0 | 3 | 6 | 9 | 12 | 15 | 18 | 21 | 24 | 27 | 30 |
|---|---|---|---|---|---|---|---|---|---|---|---|---|---|---|---|---|---|---|---|---|---|
| 30 | | | | | | | | | | | | | | | | | | | | | |
| 27 | | | | | | | | | | | 106.1 | | | | | | | | | | |
| 24 | | | | | 106.4 | 106.1 | 106.1 | 106.1 | 106.1 | 106.0 | 106.1 | 106.1 | 106.1 | 106.1 | 106.0 | | | | | | |
| 21 | | | 106.5 | 106.3 | 106.1 | 106.1 | 106.1 | 106.1 | 106.1 | 106.1 | 106.1 | 106.1 | 106.0 | 105.9 | 106.0 | 106.3 | | | | |
| 18 | | 104.9 | 104.8 | 105.4 | 105.7 | 106.1 | 106.1 | 106.1 | 106.1 | 106.1 | 106.1 | 106.1 | 106.1 | 106.0 | 106.1 | 106.3 | 106.4 | | | |
| 15 | | 102.7 | 102.5 | 104.0 | 104.9 | 105.8 | 105.9 | 105.9 | 106.2 | 106.1 | 105.9 | 106.1 | 106.1 | 106.2 | 106.1 | 105.8 | 105.5 | 105.1 | 105.2 | | |
| 12 | 102.1 | 101.2 | 101.1 | 102.7 | 104.9 | 105.7 | 105.8 | 105.5 | 106.1 | 106.3 | 105.8 | 105.6 | 106.1 | 106.5 | 106.3 | 104.9 | 104.4 | 103.3 | 103.6 | | |
| 9 | 101.2 | 101.4 | 101.7 | 102.7 | 103.3 | 103.6 | 104.5 | 105.4 | 105.9 | 105.9 | 106.1 | 106.4 | 106.1 | 106.3 | 105.9 | 104.9 | 103.6 | 102.5 | 102.5 | | |
| 6 | 101.4 | 102.4 | 102.8 | 101.9 | 101.7 | 102.2 | 103.3 | 104.5 | 104.0 | 105.4 | 105.8 | 106.7 | 106.8 | 105.5 | 103.5 | 103.2 | 103.5 | 103.6 | 102.6 | 101.6 | |
| 3 | 103.3 | 103.2 | 102.9 | 102.7 | 101.6 | 100.4 | 101.4 | 102.5 | 104.0 | 105.0 | 105.8 | 106.3 | 105.9 | 103.9 | 103.5 | 101.4 | 101.9 | 102.5 | 103.3 | 103.6 | |
| 0 | 109.1 | 107.0 | 104.8 | 103.1 | 102.7 | 102.2 | 99.8 | 98.2 | 102.1 | 105.0 | 106.4 | 106.1 | 102.9 | 101.7 | 101.4 | 102.4 | 103.7 | 104.7 | 104.1 | 103.6 | |
| -3 | 112.0 | 109.1 | 106.2 | 105.5 | 103.6 | 98.3 | 94.6 | 96.5 | 99.8 | 104.2 | 105.7 | 104.8 | 99.5 | 99.7 | 101.5 | 102.6 | 103.8 | 104.1 | 104.5 | 106.2 | |
| -6 | 116.6 | 114.8 | 111.0 | 109.4 | 103.6 | 97.8 | 91.7 | 96.1 | 99.8 | 100.7 | 100.7 | 100.7 | 98.1 | 99.8 | 102.1 | 103.1 | 105.4 | 104.1 | 105.4 | 107.5 | |
| -9 | 119.7 | 119.1 | 114.8 | 111.0 | 109.4 | 104.2 | 98.8 | 91.2 | 92.1 | 91.8 | 95.8 | 95.8 | 98.8 | 99.8 | 104.0 | 105.4 | 106.6 | 108.0 | 107.8 | 107.5 | |
| -12 | 127.8 | 125.0 | 113.9 | 112.6 | 103.9 | 101.2 | 93.0 | 87.5 | 87.5 | 83.1 | 93.0 | 100.0 | 105.3 | 102.1 | 104.0 | 107.7 | 110.5 | 113.9 | 110.6 | 107.6 | |
| -15 | | 133.4 | 120.7 | 116.4 | 116.5 | 105.4 | 103.1 | 92.6 | 83.5 | 76.9 | 81.5 | 89.6 | 101.2 | 105.3 | 106.2 | 110.9 | 113.8 | 118.3 | 112.6 | 107.5 | |
| -18 | | 137.3 | 127.5 | 121.5 | 112.4 | 108.8 | 102.2 | 87.9 | 80.9 | 74.8 | 77.9 | 85.9 | 101.8 | 108.7 | 111.1 | 114.9 | 118.7 | 124.9 | 114.0 | 105.2 | |
| -21 | | 130.9 | 132.4 | 127.3 | 117.8 | 100.0 | 99.0 | 82.6 | 79.4 | 74.8 | 76.2 | 83.1 | 100.6 | 108.7 | 111.5 | 118.2 | 122.7 | 126.5 | 136.5 | 115.5 | |
| -24 | | 131.6 | 132.4 | 127.3 | 130.4 | 99.0 | 78.5 | 75.5 | 77.9 | 74.7 | 75.2 | 81.2 | 97.7 | 111.1 | 110.9 | 115.3 | 129.9 | 135.6 | 149.0 | 116.7 | |
| -27 | | | | 130.9 | 131.6 | 130.4 | 100.8 | 75.5 | 76.9 | 74.7 | 74.6 | 80.0 | 95.5 | 111.4 | 115.3 | 122.9 | 137.7 | 143.7 | | | |
| -30 | | | | | | 105.7 | 74.3 | 74.3 | 76.4 | 74.7 | 74.3 | 79.7 | 96.4 | 112.9 | 121.2 | 137.7 | 149.7 | 156.8 | | | |
| mm | | | | | | | | | | | 74.3 | | | | 122.6 | | | | | | | mm ↑ (vertical axis) / mm → (horizontal axis)

Fig. 8B

Sph 0 dpt    Add + 2 dpt

| mm | -30 | -27 | -24 | -21 | -18 | -15 | -12 | -9 | -6 | -3 | 0 | 3 | 6 | 9 | 12 | 15 | 18 | 21 | 24 | 27 | 30 |
|---|---|---|---|---|---|---|---|---|---|---|---|---|---|---|---|---|---|---|---|---|---|
| 30 | | | | | | | | | | | 105.3 | | | | | | | | | | |
| 27 | | | | | | | | | | 105.9 | 105.9 | 105.9 | | | | | | | | | |
| 24 | | | | | | | | 105.9 | 105.9 | 106.5 | 106.5 | 106.5 | 106.4 | 106.3 | 106.5 | 106.6 | | | | | |
| 21 | | | | | 106.5 | 106.5 | 106.5 | 106.5 | 106.4 | 107.0 | 107.1 | 107.2 | 107.0 | 106.7 | 106.7 | 107.1 | 107.5 | 107.1 | | | |
| 18 | | | | 106.2 | 107.1 | 107.2 | 107.2 | 107.1 | 107.0 | 107.7 | 107.6 | 107.6 | 107.5 | 107.4 | 107.1 | 107.0 | 106.7 | 105.9 | 104.5 | | |
| 15 | | | 103.1 | 105.1 | 106.4 | 107.2 | 107.6 | 107.6 | 107.7 | 108.3 | 107.9 | 107.7 | 107.5 | 108.2 | 108.2 | 107.2 | 106.7 | 105.2 | 103.2 | | |
| 12 | | | 102.6 | 103.4 | 105.0 | 106.8 | 107.9 | 108.3 | 108.4 | 108.9 | 108.2 | 107.9 | 107.9 | 109.1 | 109.0 | 106.8 | 103.6 | 101.6 | | 103.5 | |
| 9 | | 104.8 | 102.1 | 101.7 | 103.7 | 106.4 | 108.2 | 109.0 | 109.2 | 108.1 | 108.1 | 108.1 | 108.0 | 106.9 | 105.0 | 103.4 | 102.2 | 101.3 | 100.7 | 100.9 | |
| 6 | | 100.6 | 100.2 | 100.6 | 101.7 | 103.3 | 105.3 | 107.1 | 107.9 | 108.1 | 108.0 | 108.1 | 107.6 | 106.7 | 105.0 | 100.1 | 100.8 | 101.0 | 99.7 | 98.3 | |
| 3 | | 96.7 | 98.3 | 99.6 | 99.7 | 100.3 | 102.6 | 105.3 | 106.6 | 107.2 | 108.3 | 107.6 | 107.6 | 104.7 | 101.3 | 100.1 | 102.4 | 102.8 | 99.0 | 98.3 | |
| 0 | | 101.9 | 101.3 | 101.3 | 101.6 | 102.5 | 104.1 | 105.7 | 106.6 | 107.2 | 107.6 | 106.6 | 106.6 | 104.9 | 103.2 | 102.4 | 102.4 | 102.6 | 103.3 | 104.2 | |
| -3 | 93.5 | 89.1 | 85.8 | 84.6 | 85.8 | 88.4 | 91.7 | 96.1 | 101.7 | 106.3 | 107.0 | 102.7 | 96.2 | 91.9 | 89.8 | 87.5 | 85.4 | 85.0 | 87.1 | 90.2 | |
| -6 | | 93.7 | 92.1 | 91.2 | 91.6 | 92.7 | 94.0 | 96.8 | 101.9 | 105.6 | 107.0 | 99.8 | 94.4 | 91.0 | 89.5 | 88.5 | 87.9 | 88.2 | 89.6 | 91.3 | |
| -9 | | 120.6 | 125.4 | 126.2 | 122.9 | 116.9 | 109.9 | 105.1 | 103.8 | 101.9 | 104.5 | 99.8 | 97.6 | 99.4 | 101.6 | 105.2 | 109.8 | 112.5 | 111.7 | 109.6 | |
| -12 | | 88.2 | 87.8 | 87.9 | 87.7 | 88.9 | 88.9 | 89.6 | 88.8 | 88.0 | 98.1 | 96.3 | 97.1 | 86.1 | 85.3 | 84.6 | 109.8 | 84.6 | 85.7 | 86.4 | |
| -15 | | 90.8 | 88.5 | 87.6 | 87.7 | 88.1 | 88.1 | 86.5 | 86.7 | 88.1 | 88.1 | 83.0 | 85.1 | 87.1 | 88.2 | 84.3 | 84.0 | 86.9 | 87.3 | 86.4 | 92.5 |
| -18 | | | 88.0 | 86.4 | 85.4 | 84.4 | 83.0 | 80.6 | 79.2 | 80.2 | 80.2 | 82.8 | 85.1 | 84.7 | 88.2 | 84.0 | 85.2 | 87.3 | 89.7 | | |
| -21 | | | 79.8 | 80.0 | 78.1 | 77.1 | 75.8 | 75.0 | 74.6 | 75.7 | 75.8 | 77.8 | 80.6 | 82.4 | 83.2 | 76.0 | 76.8 | 86.2 | 86.7 | | |
| -24 | | | | 86.2 | 83.7 | 79.1 | 76.4 | 75.3 | 74.9 | 74.8 | 74.7 | 75.2 | 76.3 | 77.7 | 79.4 | 81.5 | 78.5 | 79.4 | 78.7 | | |
| -27 | | | | | 84.4 | 79.7 | 76.4 | 74.8 | 74.4 | 74.5 | 74.5 | 74.8 | 75.8 | 78.4 | 81.8 | 83.7 | 83.6 | 84.8 | | | |
| -30 | | | | | | 75.5 | 73.1 | 73.1 | 72.6 | 72.9 | 72.8 | 73.0 | 74.4 | 78.3 | 82.4 | | | | | | | mm

Fig. 9A

Sph +1.75 dpt    Add +2dpt

| mm | -30 | -27 | -24 | -21 | -18 | -15 | -12 | -9 | -6 | -3 | 0 | 3 | 6 | 9 | 12 | 15 | 18 | 21 | 24 | 27 | 30 |
|---|---|---|---|---|---|---|---|---|---|---|---|---|---|---|---|---|---|---|---|---|---|
| 30 | | | | | | | | | | | | | | | | | | | | | |
| 27 | | | | | | | | | | | 101.2 | | | | | | | | | | |
| 24 | | | | | | | | 99.9 | 100.4 | 100.5 | 101.0 | 101.2 | 100.5 | 100.5 | 100.1 | | | | | | |
| 21 | | | | | 98.6 | 99.2 | 99.9 | 100.5 | 100.4 | 100.5 | 100.8 | 101.0 | 100.9 | 100.6 | 100.1 | 99.9 | | | | | |
| 18 | | | 97.9 | 98.5 | 98.3 | 99.2 | 99.9 | 100.4 | 100.4 | 100.6 | 100.7 | 101.0 | 101.1 | 101.0 | 100.0 | 99.4 | 99.3 | | | | |
| 15 | | 97.8 | 97.8 | 98.3 | 98.3 | 98.9 | 99.6 | 100.2 | 100.4 | 100.7 | 100.9 | 101.1 | 101.1 | 100.8 | 99.8 | 99.2 | 98.9 | 98.7 | | | |
| 12 | | 98.0 | 97.7 | 97.7 | 97.9 | 98.3 | 99.1 | 99.9 | 100.4 | 101.0 | 101.3 | 101.5 | 100.8 | 100.2 | 99.5 | 99.0 | 98.6 | 98.6 | 98.8 | | |
| 9 | 97.3 | 98.2 | 98.2 | 96.7 | 97.4 | 97.7 | 98.4 | 99.3 | 100.4 | 101.3 | 101.8 | 101.8 | 100.8 | 99.7 | 99.0 | 98.6 | 98.3 | 98.4 | 98.4 | 98.2 | |
| 6 | 97.3 | 98.2 | 97.5 | 97.1 | 97.1 | 97.1 | 97.4 | 98.3 | 100.1 | 101.6 | 102.0 | 101.9 | 100.5 | 99.4 | 98.3 | 97.7 | 97.6 | 97.9 | 98.6 | 98.5 | |
| 3 | 97.1 | 98.0 | 97.3 | 97.0 | 97.0 | 96.7 | 96.1 | 96.8 | 99.7 | 101.9 | 102.1 | 101.8 | 100.3 | 98.9 | 97.6 | 96.6 | 96.8 | 97.8 | 98.6 | 99.0 | |
| 0 | 96.9 | 97.7 | 97.3 | 97.3 | 97.3 | 96.7 | 94.7 | 94.7 | 99.8 | 102.0 | 102.2 | 101.6 | 99.3 | 97.6 | 96.8 | 96.3 | 96.7 | 97.7 | 98.4 | 99.0 | |
| -3 | 96.6 | 97.5 | 97.7 | 98.2 | 99.4 | 97.4 | 93.6 | 92.6 | 97.2 | 100.9 | 101.6 | 100.9 | 98.5 | 95.7 | 96.2 | 97.1 | 97.5 | 97.7 | 98.4 | 97.9 | |
| -6 | 96.5 | 97.9 | 98.4 | 99.4 | 98.8 | 99.4 | 94.8 | 92.4 | 94.2 | 98.0 | 98.0 | 98.5 | 96.0 | 95.1 | 96.6 | 98.5 | 98.6 | 98.1 | 98.0 | 97.1 | |
| -9 | 96.9 | 99.0 | 99.9 | 101.1 | 99.1 | 101.0 | 97.8 | 94.2 | 89.8 | 91.1 | 94.3 | 94.0 | 95.6 | 95.1 | 96.6 | 99.6 | 99.5 | 98.8 | 98.5 | 97.4 | |
| -12 | 97.4 | 100.1 | 102.3 | 104.5 | 104.6 | 101.0 | 99.9 | 93.8 | 85.2 | 88.1 | 84.3 | 88.8 | 96.0 | 97.1 | 98.2 | 99.6 | 99.3 | 99.6 | 100.3 | 99.2 | |
| -15 | 98.1 | 102.5 | 105.8 | 110.0 | 109.0 | 104.6 | 97.9 | 88.7 | 81.3 | 77.5 | 79.3 | 84.2 | 96.4 | 101.1 | 100.1 | 99.4 | 98.2 | 100.5 | 103.1 | 102.5 | |
| -18 | | 104.1 | 108.8 | 114.7 | 112.0 | 109.0 | 94.1 | 83.2 | 78.7 | 76.2 | 79.3 | 81.0 | 95.1 | 105.6 | 101.2 | 97.8 | 97.7 | 101.5 | 105.7 | | |
| -21 | | 105.3 | 110.0 | 115.9 | 111.5 | 108.4 | 90.6 | 79.6 | 76.6 | 76.3 | 76.7 | 79.5 | 91.5 | 105.6 | 100.6 | 96.6 | 98.8 | 102.7 | | | |
| -24 | | | 109.6 | 113.8 | 108.4 | 88.2 | 87.1 | 77.9 | 77.3 | 76.8 | 76.4 | 78.8 | 87.5 | 94.9 | 98.6 | 96.6 | 100.3 | 103.8 | | | |
| -27 | | | | 109.9 | 104.1 | | 86.9 | 78.0 | 77.2 | 76.7 | 76.4 | 78.4 | 83.0 | 91.1 | 96.0 | 97.5 | 97.5 | | | | |
| -30 | | | | | | | | 79.1 | 77.2 | 76.1 | 75.6 | 77.9 | 83.8 | 89.4 | 92.8 | | | | | | |

Fig.9B

Sph +1.75 dpt    Add +2dpt

| mm | -30 | -27 | -24 | -21 | -18 | -15 | -12 | -9 | -6 | -3 | 0 | 3 | 6 | 9 | 12 | 15 | 18 | 21 | 24 | 27 | 30 |
|---|---|---|---|---|---|---|---|---|---|---|---|---|---|---|---|---|---|---|---|---|---|
| 30 |  |  |  |  |  |  |  |  |  |  |  |  |  |  |  |  |  |  |  |  |  |
| 27 |  |  |  |  |  |  |  |  |  |  |  |  |  |  |  |  |  |  |  |  |  |
| 24 |  |  |  |  |  |  |  |  |  |  | 100.4 |  |  |  |  |  |  |  |  |  |  |
| 21 |  |  |  |  | 100.5 | 100.8 | 100.9 | 100.9 | 100.8 | 100.7 | 100.7 | 100.8 | 101.0 | 101.1 | 100.9 | 100.6 | 100.4 |  |  |  |  |
| 18 |  |  |  | 101.0 | 101.6 | 102.0 | 102.1 | 101.9 | 101.7 | 101.5 | 101.4 | 101.7 | 102.2 | 102.4 | 102.0 | 101.4 | 101.2 | 101.3 |  |  |  |
| 15 |  |  | 99.5 | 100.1 | 100.8 | 101.3 | 101.6 | 101.6 | 101.5 | 101.4 | 101.4 | 101.5 | 101.7 | 101.8 | 101.6 | 101.2 | 100.7 | 100.8 | 100.5 | 100.1 |  |
| 12 |  | 97.6 | 98.9 | 99.6 | 100.2 | 100.9 | 101.4 | 101.7 | 101.5 | 101.4 | 101.4 | 101.6 | 101.5 | 101.5 | 101.6 | 101.0 | 99.9 | 100.1 | 99.4 | 98.3 |  |
| 9 |  | 96.5 | 98.6 | 99.3 | 100.0 | 100.8 | 101.5 | 102.0 | 102.2 | 102.1 | 102.1 | 102.0 | 101.9 | 101.9 | 100.9 | 100.3 | 99.5 | 98.9 | 98.3 | 97.3 |  |
| 6 |  | 96.2 | 97.3 | 98.0 | 98.7 | 99.6 | 100.8 | 101.7 | 102.1 | 102.2 | 102.3 | 102.2 | 101.9 | 101.5 | 100.5 | 98.2 | 97.3 | 98.7 | 97.9 | 96.1 |  |
| 3 |  | 95.2 | 95.7 | 96.2 | 96.9 | 98.1 | 99.7 | 101.0 | 102.0 | 102.2 | 102.3 | 102.4 | 102.4 | 101.5 | 99.9 | 98.2 | 97.3 | 97.0 | 96.8 | 94.2 |  |
| 0 |  | 93.1 | 93.4 | 93.7 | 94.4 | 95.6 | 97.4 | 99.4 | 101.2 | 102.2 | 102.5 | 102.4 | 101.9 | 100.3 | 97.8 | 95.6 | 94.6 | 94.6 | 94.7 | 94.2 |  |
| -3 | 87.3 | 86.8 | 86.5 | 86.6 | 87.1 | 87.8 | 89.1 | 92.4 | 97.7 | 101.9 | 102.5 | 100.0 | 96.0 | 92.5 | 90.3 | 89.1 | 88.3 | 87.7 | 87.5 | 87.4 |  |
| -6 |  | 82.2 | 81.7 | 81.7 | 82.2 | 82.8 | 84.2 | 88.0 | 94.5 | 100.0 | 100.6 | 96.7 | 90.9 | 86.6 | 84.9 | 84.3 | 83.5 | 82.5 | 81.8 | 81.8 |  |
| -9 |  | 81.3 | 81.5 | 82.0 | 83.2 | 85.6 | 88.7 | 90.9 | 91.1 | 90.6 | 89.9 | 88.2 | 85.8 | 84.0 | 83.5 | 83.0 | 81.8 | 79.9 | 78.1 | 77.1 |  |
| -12 |  | 81.5 | 82.3 | 83.3 | 85.0 | 88.3 | 92.3 | 92.3 | 87.6 | 83.5 | 82.3 | 82.4 | 82.5 | 82.8 | 83.0 | 82.5 | 80.9 | 78.5 | 76.2 | 74.7 |  |
| -15 |  | 85.4 | 86.9 | 88.2 | 89.1 | 89.2 | 88.0 | 85.3 | 81.8 | 79.6 | 79.5 | 81.3 | 84.9 | 85.8 | 85.2 | 83.5 | 82.0 | 80.9 | 80.0 | 78.8 |  |
| -18 |  | 90.6 | 92.1 | 92.1 | 89.3 | 85.1 | 81.6 | 80.4 | 77.9 | 77.0 | 77.6 | 80.4 | 84.9 | 86.4 | 86.1 | 84.1 | 83.0 | 83.1 | 83.4 |  |  |
| -21 |  | 87.2 | 87.7 | 87.3 | 85.1 | 81.8 | 79.4 | 78.8 | 77.7 | 77.4 | 77.6 | 78.5 | 80.2 | 81.5 | 81.9 | 81.8 | 82.0 | 82.4 | 82.6 |  |  |
| -24 |  |  | 84.5 | 83.7 | 81.8 | 79.4 | 78.2 | 77.5 | 78.0 | 78.3 | 77.6 | 77.3 | 76.7 | 77.1 | 78.5 | 80.3 | 81.6 | 82.2 |  |  |  |
| -27 |  |  |  | 80.8 | 79.5 | 78.2 | 77.8 | 77.6 | 77.6 | 77.8 | 77.6 | 76.9 | 76.2 | 76.5 | 78.0 | 79.9 | 81.5 |  |  |  |  |
| -30 |  |  |  |  |  |  | 77.8 | 77.6 | 77.3 | 77.2 | 77.2 | 77.2 | 77.3 | 77.9 | 79.0 |  |  |  |  |  |  | mm →

MULTI-FOCAL SPECTACLE LENS WITH A DIOPTRIC POWER VARYING PROGRESSIVELY BETWEEN DIFFERENT ZONES OF VISION

RELATED CASE

This application is a continuation-in-part of application, Ser. No. 258,995, filed Apr. 30, 1981, now abandoned.

BACKGROUND OF THE INVENTION

The present invention concerns a multi-focal spectacle lens with a dioptric power varying progressively between different zones of vision. Such spectacle lenses are referred to generally as progressive lenses.

That surface of the spectacle lens which effects the desired progressively varying course of the dioptric power of the lens is referred to as the progressive surface. The far-vision zone is located within its upper part and the near-vision zone is in its lower part. Between these two zones lies the progressive zone, in which the far-vision dioptric power of the lens progressively passes into the near-vision dioptric power. If a user of such a spectacle lens looks straight on and moves the line of sight downward to the bottom of the lens, the pre-established course of the dioptric powers for each inclination of the sight determines the distance of an object sharply focused. For each object distance, there is a corresponding inward movement of the line of sight and therefore of the person's eyes. The progressive surface of such a spectacle lens is characterized by a variation in dioptric power along the resulting accomodation-convergence path of the eye. This path is called the principal sight line. The principal sight line is a curve on the progressive surface of the lens, which is swung toward the nose. The principal sight line divides the lens surface into a nasal region and a temporal region.

A large number of different progressive lenses are known. In most of these lenses, such as those described for instance, in West German Provisional Patent (Auslegeschriften) Nos. 2,044,639, 2,336,708, and 2,439,127, and in West German published application (Offenlegungsschriften) Nos. 2,814,916 and 2,918,310, the progression line or the principal meridian is developed as a so-called umbilic line. This line in general does not follow the course of the principal sight line defined above. The umbilic development means that at each point of this line the surface curvatures are of the same value. In this way, the result is obtained that the surface astigmatism along this line has a value of zero.

In an article published in the journal *Optica Acta*, Vol. 10, No. 3, July 1963, pages 223/227, Minkwitz has proven that in a spectacle lens with an umbilic meridian line, the surface astigmatism in the direction transverse to this line changes at twice the rate of change of the average surface refractive power along the meridian line.

There has been no lack of effort to reduce to a tolerable magnitude the imaging error caused by use of an umbilic line, by special shaping of the progressive surface.

Thus, from West German Provisional Patent No. 2,044,639, it is known to develop the progressive surface in such manner that at intersection with horizontal planes there are produced, in each case, curves of intersection which have the shape of conical sections. This approach involves a certain compromise between astigmatism, focusing error and distortion, but this compromise does not satisfy higher requirements.

From West German Provisional Patent No. 2,336,708, it is known to develop a progressive surface which is symmetrical to the umbilic meridian line in such a manner that the rate of change of the deformation of vertical or horizontal lines viewed through the spectacle lens is a small as possible, upon swinging the eye. This minimizing of the rate of change is one of various possibilities of improving the compatibility of a spectacle lens as compared with the previous prior art; however, its use alone does not lead to optimum results.

In West German published Application No. 2,918,310, it is proposed to form the progressive surface from two geometrically different surfaces. This approach yields the result that so-called skew distortion remains small on both sides of relatively wide progressive and near-vision zones. With this approach, which also involves symmetry with respect to an umbilic meridian line, the characteristic of the lens along the lines of intersection of the two geometrically different surfaces is disadvantageous, since discontinuity of the curvatures results in a discontinuity of astigmatism and focusing error.

In the spectacle lens known from West German Provisional Patent No. 2,439,137, oblique distortion in the lateral edge parts of the progressive zone and of the near-vision zone is to be caused to disappear by a special development of said parts; however, other imaging errors, particularly astigmatism, cannot be sufficiently compensated in this manner.

The spectacle lens in accordance with West German published Application No. 2,814,916 also involves symmetry with respect to an umbilic meridian line. With this lens a course of curvature of the progressive surface is established by formula, in order to obtain a large far-vision zone and a large near-vision zone. It will be understood that it is not possible in this way to keep imaging errors sufficiently small over the entire surface and still have an acceptable length of the progressive zone.

From West German published Application No. 2,610,203, it is known to develop the principal meridian non-umbilically in one part thereof. In this design approach, lines of the same average surface dioptric power are preferably horizontal and extend on both sides of the principal meridian up to the edge of the spectacle lens. Not all imaging errors can be optimally corrected by this aproach.

In a very early publication, namely, German Pat. No. 1,145,820, a progressive lens is disclosed in which the principal-curvature radii differ by a constant amount, at each point of the progressive surface; the surface astigmatism is therefore constant as to its amount. This approach results in less astigmatism in the lateral regions than in known solutions; but the technique uses a progressive surface of rotational symmetry, and there is insufficient correction of all imaging errors.

A spectacle lens generally has, in all regions outside its optical axis a prismatic power which becomes continuously stronger towards the edge of the lens. If, when viewing an object, both eyes look through regions of different prismatic power in the respective spectacle lenses, as for example, in the case of progressive lenses of known type, the directions of the eye-side lines of sight (i.e., line of sight directions on the eye side of the respective lenses) do not agree and therefore there is a horizontal and a vertical directional error.

In direct viewing, i.e., when looking at a fixed object, a horizontal directional error negatively influences the depth perception with the result, for example, that the points of a flat object no longer appear to lie in a plane.

In direct viewing, horizontal directional errors can be compensated by the vergency of the eyes within a relatively large range of tolerance. The compensating of vertical directional errors in direct viewing by fusional vertical vergency of the eyes, on the other hand, is possible only within narrow limits. For example, the binocular prismatic vertical tolerance for the vertical centering of two spectacle lenses is only 0.5 cm/m. The stronger the vertical directional error the more inconvenient the fusion becomes. If the directional errors are too great, the wearer of the spectacle lenses no longer has any impression of binocular vision. Either the wearer of the lenses will instinctively avoid looking through such regions of the spectacle lenses, or he will take into account only the visual impression from the left or from the right eye. Vertical directional errors can also lead to considerable orientation difficulty when reading, particularly when the eyes jump back to the beginning of a line of text.

BRIEF STATEMENT OF THE INVENTION

The object of the present invention is to provide a multifocal spectacle lens with a dioptric power varying progressively between different zones of vision, i.e., a progressive lens which, with a short progressive zone, substantially satisfies in each zone all monocular and binocular requirements for sharpness and compatability.

The invention achieves this object with a progressive lens which is characterized by combination of the following features:

(a) the far-vision zone is well corrected; in its nasal and temporal lower region the zone of increasing dioptric power commences, the amounts of astigmatism and focusing error, however, being kept sufficiently small;

(b) within a short progressive zone, along the principal sight line, astigmatism is present within the limits of a permissible reduction of the vision;

(c) the near-vision zone consists of a sufficiently wide, well-corrected zone which is substantially horizontally symmetrical with respect to the principal sight line;

(d) distortion passes laterally of the principal sight line in the progression and near-vision zones into values which approximate the distortion of the far-vision zone, the distortion nasally and temporally of the principal sight line being so selected that the horizontal and vertical directional errors do not exceed tolerable values.

For a predetermined dioptric power, the entire progressive surface is sufficiently determined by the combination of these features after establishment of the other parameters of the lens (e.g., refractive index, thickness, other surface). In the resulting progressive surface, individual zones are not interrelated by formula; the resulting surface msut therefore be considered an asphere in the most general sense.

A progressive spectacle lens constructed according to the invention, for the first time takes into account the sensitivity of a spectacle lens wearer to binocularly non-harmonizing directions of sight.

In the spectacle lens of the invention, horizontal and vertical directional errors are reduced to tolerable values by a suitable selection of the tolerable distortion on both sides of the principal sight line. To obtain this result, the tolerable distortion is intentionally not selected such that in certain regions horizontal lines are imaged in horizontal lines and vertical lines in vertical lines, as in the case of certain known progressive lenses. Rather, one tolerates a balanced distortion (with respect to the quiescent and viewing eye) of approximately that shape to which the spectacle lens wearer has been accustomed through use of his single-focus lenses.

The progressive surface is advantageously so developed that, over the entire surface, points having the same horizontal distance from the principal sight line and for the same elevation exhibit approximately the same values of astigmatism and focusing error. Such horizontal symmetry means that the user will see an equally sharp or an equally blurred image of the object with both eyes; as a result, binocular viewing becomes very pleasing.

Prior art lenses having symmetry with respect to a straight umbilic meridian line must, when inserted into the lens frame, be turned by about 10° in order to take into account the accomodation-convergence of the eyes. It is self-evident that, having thus partially rotated the lens, horizontal symmetry is lost with respect to all imaging properties. In contradistinction, spectacle lenses in accordance with the invention need not be partially rotated when fitted into the spectacle-frame since the course of the principal sight line is determined by the accomodation-convergence path of the eyes.

In the spectacle lens constructed according to the invention, the astigmatism present along the principal sight line has value near to zero in the lower region of the far-vision zone, reaches its maximum value in the progressive zone, and drops again to a value near to zero in the near-vision zone. This course of the astigmatism is more difficult to describe mathematically than an umbilic line, but it creates new degrees of freedom. The imaging properties laterally of the principal sight line can be improved by them. The entire lens can be more easily corrected with respect to all errors.

When calculating the new progressive surface, several progressive surfaces with different compatible values of directional error and distortion can be established, advisedly with due consideration of the criteria tabulated (a) to (d) above. Out of those calculated surfaces, surfaces may be selected for which astigmatism is favorably distributed over the entire surface and at the same time is as small as possible.

In a preferred progressive lens of the invention, dioptric power laterally of the progressive and near-vision zones approaches the values of the far-vision zone. Thus, the same conditions are created as for fused multifocal spectacle lenses of prior art.

The shape of the progressive surface of the invention differs fundamentally from the shape of known progressive surfaces. If the progressive surface of the invention is intersected by a horizontal plane, the line of intersection is a curve, the curvature of which describes the course of the horizontal curvature of the surface from the nasal to the temporal edge of the surface. And for curves which result from such intersection with a plurality of vertically spaced horizontal planes, the following can be said of their appearance, for a progressive surface developed on the object side of the spectacle lens:

I. In the near-vision zone, the horizontal curvatures in the region of good vision differ only slightly and decrease strongly towards the side. A renewed increase of the curvature in the vicinity of the edge of the lens is possible and is dependent, inter alia, on the width of the lens. The start of such an increase can differ somewhat nasally and temporally.

II. In the progressive zone, in the lower part, the course of the curve still corresponds essentially to that of the near-vision zone. With increasing proximity to the far-vision zone, the horizontal curvatures, commencing in the vicinity of the edge of the zone of good vision, at first increase considerably toward the side and then decrease again. Such a course of curvature may be somewhat differently nasally and temporally, and can extend up into the lower part of the far-vision zone.

III. In the far-vision zone, the curves pass more and more into a course akin to the surfaces of single-focus lenses.

None of the intersection curves in zones I and II represents a conical section.

If the progressive surface is developed on the eye side, i.e., if the lens surface facing the eye is developed as the progressive surface, then, intersection with horizontal planes develops curved intersection lines having curvatures which are just the opposite to what has been set forth under I and II above. The statements made there (for the object-side case) therefore also apply to the eye-side case if one interchanges the expressions "increasing" and "decreasing" curvature.

In the new progressive surface of the invention, no longer do all lines of constant average surface dioptric power intersect the principal sight line. These are lines which begin at the edge of the surface and terminate there without having intersected or contacted the principal sight line. Islands are also possible, i.e., closed lines which extend only within the boundaries of the surface.

It is advantageous to develop the progressive surface using the known mathematical spline analysis or technique in such manner that the developed surface is twice continuously differentiable, whereby the courses of astigmatism and of focusing error are steady.

The manufacture of spectacle lenses of the invention is possible by means of numerically controlled machine tools. Such machines are known and available on the market. It is also possible to manufacture spectacle lenses in accordance with the invention from organic material and to use for this purpose, for instance, known injection-molding or other casting technique.

DETAILED DESCRIPTION

The invention will be explained in further detail in conjunction with the accompanying drawings, in which:

FIG. 7 is a graph showing the course of horizontal curvature in several horizontal surface sections through said progressive surface;

FIG. 8A is a chart of radii at equidistant points along various horizontal sections of the progressive-power surface of the lens of FIGS. 3 to 7;

FIG. 8B is a chart of radii at equidistant points along various vertical sections of the progressive-power surface of the lens of FIGS. 3 to 7; and FIGS. 9A and 9B are charts similar to those of FIGS. 8A and 8B and respectively showing corresponding data as to radii along corresponding horizontal and vertical sections of the progressivepower surface of another embodiment of the invention.

Figure 1:
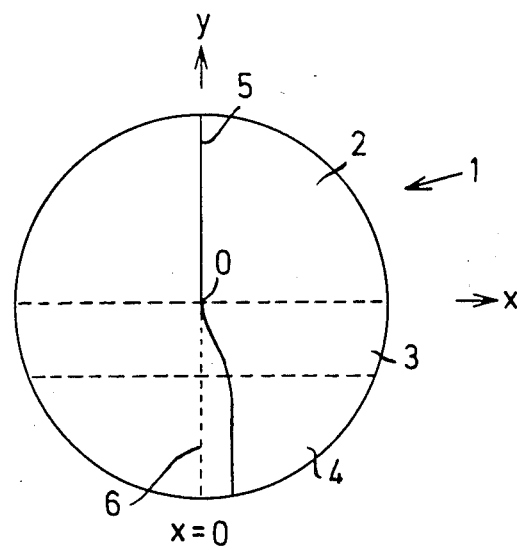
FIG. 1 is a view in front elevation to show a progressive surface.

FIG. 1 shows a progressive surface 1 which in its upper part consists of a far-vision zone 2. Adjoining this zone is a progressive zone 3 which passes into the near-vision zone 4. If the eye (which is imagined to be behind the spectacle lens 1) looks straight through the far-vision zone at a point located at infinity, then the point of penetration of the line of sight lies in the far-vision part 2 on the line 5. If, with lowering view, the object point observed approaches the eye from any finite distance up to reading distance, then the pair of eyes undergoes a accommodation-converging movement. The penetration point of the lines of sight follows the solid-line curve 5, which is hereafter referred to as the principal sight line. This line is non-linear and divides the spectacle lens 1 into a nasal region, and a temporal region. The center line of the lens 1, i.e., the line x=0, is designated 6.

Figure 2:
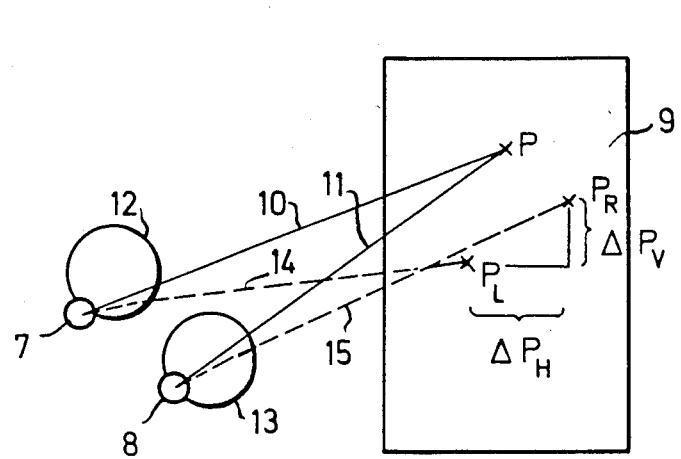
FIG. 2 is a sketch used to explain the concept of directional error.

FIG. 2 diagrammatically shows two eyes 7 and 8. If they look directly at a point P in the object plane, then the lines of sight extend in the manner shown by the lines 10 and 11. If spectacle lenses 12, 13 are placed in front of the eyes 7, 8 then the point P, as a result of the prismatic effects of the spectacle lenses, appears for the left eye 7 at $P_L$ and for the right eye 8 at $P_R$. The eye-side lines of sight now extend along the lines 14 and 15. The vertical difference in position is designated by $\Delta P_v$. If this is divided by the distance from the lens to the object, one obtains a measure of the vertical directional error. The same applies to the horizontal difference in position $\Delta P_H$. A similar manner of consideration applies to indirect viewing.

As can be noted from FIG. 2, the line of sight 14 extends through the nasal region of the spectacle lens 12, while the line of sight 15 extends through the temporal region of the spectacle lens 13. It is thus understandable that the conditions of FIG. 2 can be considered also on a single spectacle lens. The prismatic powers at points of the nasal region and temporal region which correspond to each other cause the directional errors.

Having used the technique described in connection with FIGS. 1 and 2 to develop optical properties (i.e. horizontal and vertical directional errors) for each of a large number (e.g. 300 to 400) of points of variously divertible sightings through the lens to be designed, the spline analysis technique is employed to develop a single surface which is twice continuously differentiable and which conforms to the full pattern of desired optical properties, within tolerable values throughout the surface, namely, horizontal and vertical direction errors are maintained at less than 0.5 cm/m, and astigmatism along the non-linear principal sight line is held within 0.5 dpt.

EXAMPLE I

As a first illustration of the above-indicated principle and technique, a demonstration will be made for the case of a spectacle lens having a spherical inner surface (i.e. $R_2$ being a constant) and having a continuous outer aspheric surface of the invention. The particular selected lens is taken to have zero power (0 diopters) in the far-vision zone and +2 diopters in the near-vision zone; the index of refraction (n) is taken to be 1.5251, the maximum thickness of the lens is 3.5 mm, and the constant inner spherical-surface radius ($R_2$) is 105.02 mm. Comparisons are made with conventional lenses meeting some of these requirements.

Figure 3:
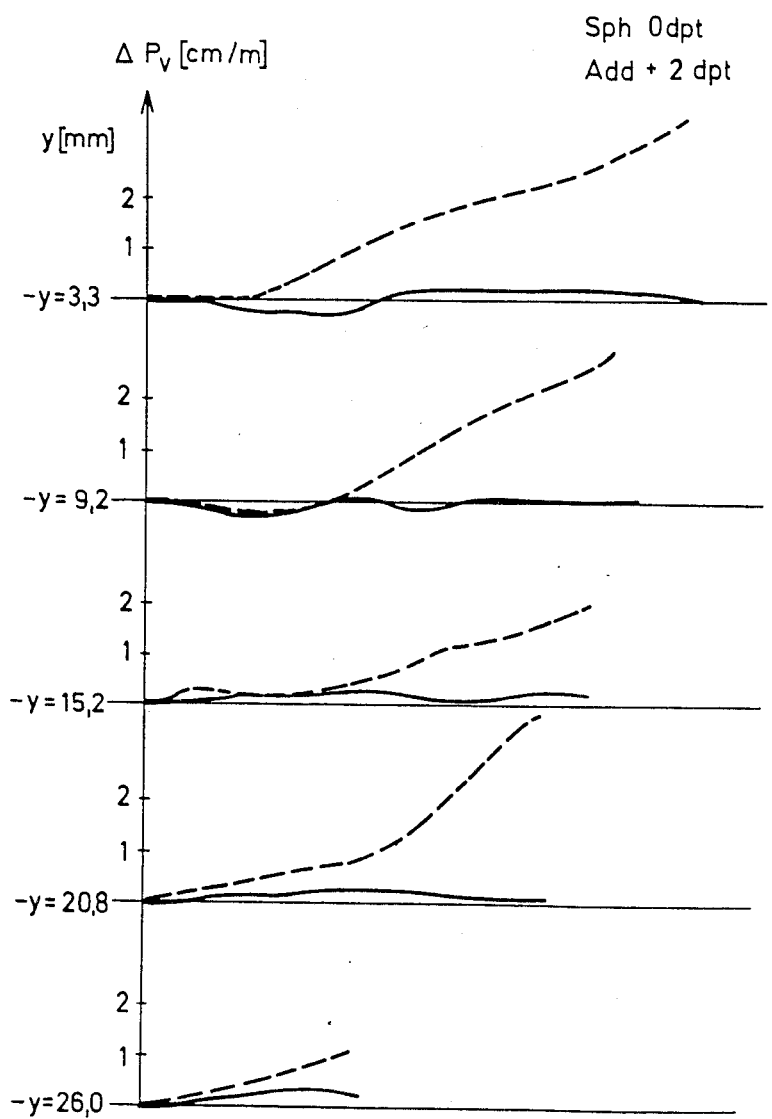
FIG. 3 is a series of graphs to comparatively show the course of vertical directional errors for a known progressive lens and for an embodiment of the invention, based on a lens diameter of about 60 mm.

In FIG. 3, dashed-line curves show vertical directional errors which are caused by a known progressive lens, the curves being for various horizontal sections calculated from point 0 in FIG. 1 and taken at successively lowered planes, noted as discrete y-axis offsets. It can be seen that toward the edge of the spectacle lens the directional errors assume considerable magnitude.

The spectacle lens of the invention is now calculated in such manner that, in the progressive and near-vision zones 3, 4, the distortion laterally of the principal sight line 5 passes into values which approach distortion in the far-vision zone 2, the distortion at each point being so selected that the horizontal and vertical directional errors do not exceed tolerable values. The resulting vertical directional error profiles are shown with solid-line curves in FIG. 3. It can be seen that the vertical directional error is in each case small and remains below a value of 0.5 cm/m.

Figure 4:
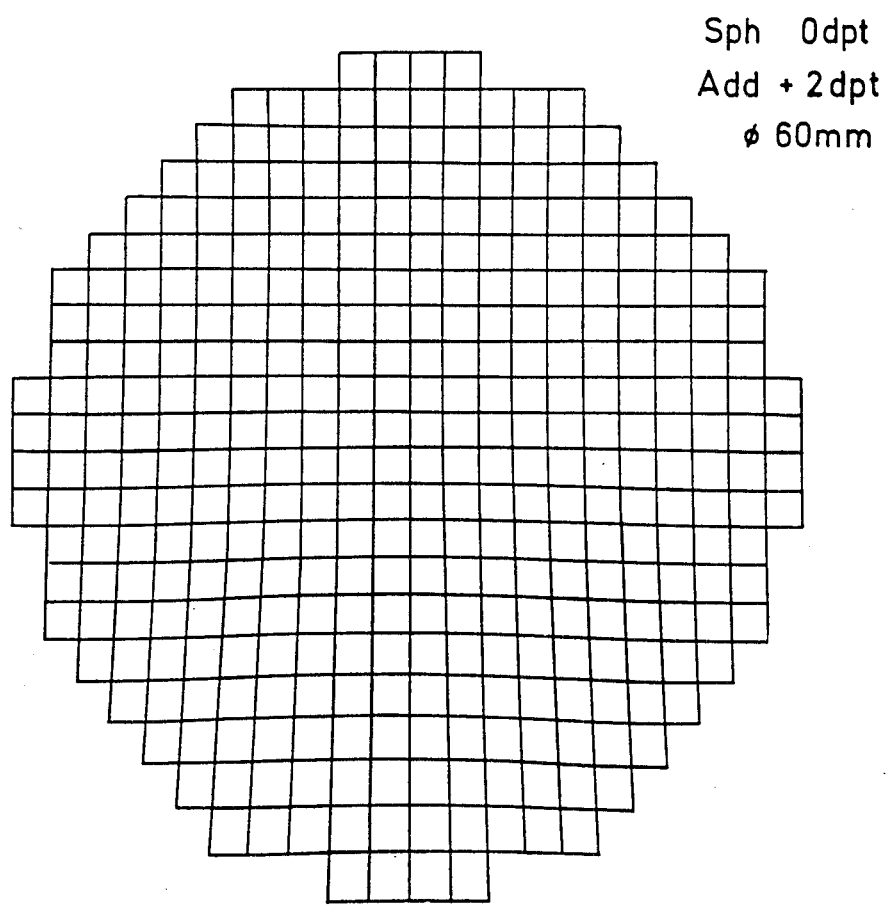
FIG. 4 shows the distortion of an equidistant-object grid, by a spectacle lens in accordance with the said embodiment of the invention.

FIG. 4 shows the imaging of an equidistant-object grid by a lens having vertical direction errors as shown in the solid-line curves of FIG. 3. It can be seen that the grid lines are curved somewhat towards the near-vision zone. The wearer of the spectacle lenses is accustomed to such a course from having worn single-focus glasses for near vision, and he therefore readily compensates, i.e., he has conditioned himself to interpret these lines as being straight.

It is known that in the case of positive single-focus lenses a cushion-shaped distortion is caused and in the case of negative single-focus lenses a barrel-shaped distortion. The user is accustomed to this and his brain processes the image actually seen so as to form an image with "straight" lines. The invention makes specific use of this human property.

Figure 5:
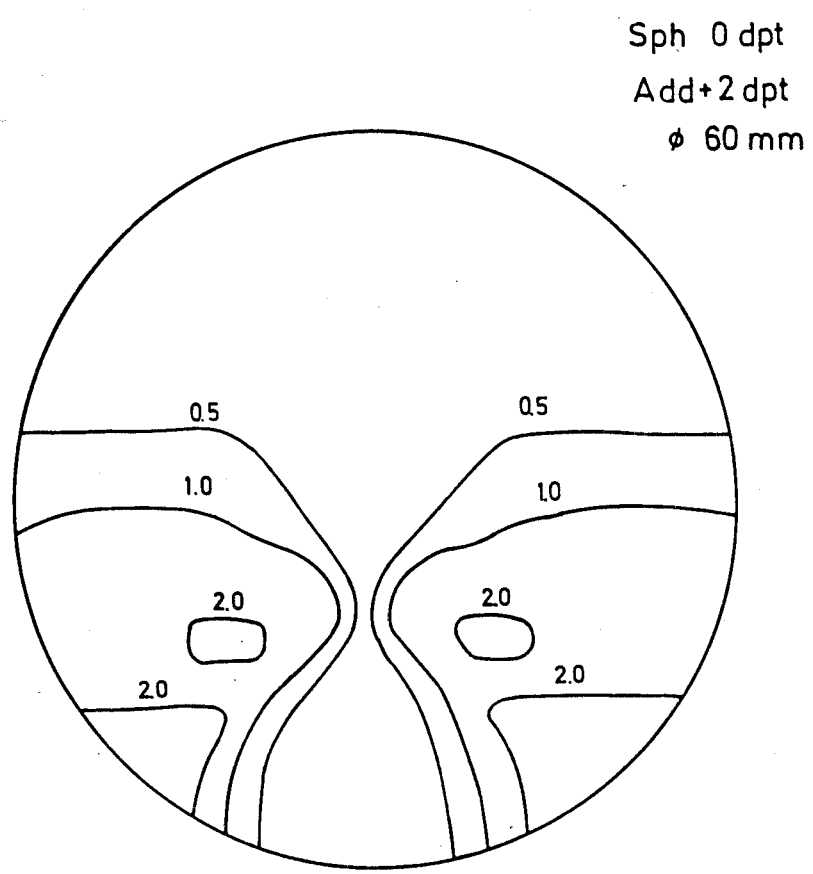
FIG. 5 is a plan view of said progressive lens of the invention, showing the distribution of the lines of equal astigmatism.

FIG. 5 shows lines of the same astigmatism distributed over the involved progressive lens surface.

The far-vision zone is seen to be large and well-corrected, and a relatively large and well-corrected region is present in the near-vision zone, while astigmatism is extremely slight (in comparison with astigmatism in prior progressive lenses). The well-corrected region in the near-vision zone is the actual near-vision region.

Figure 6:
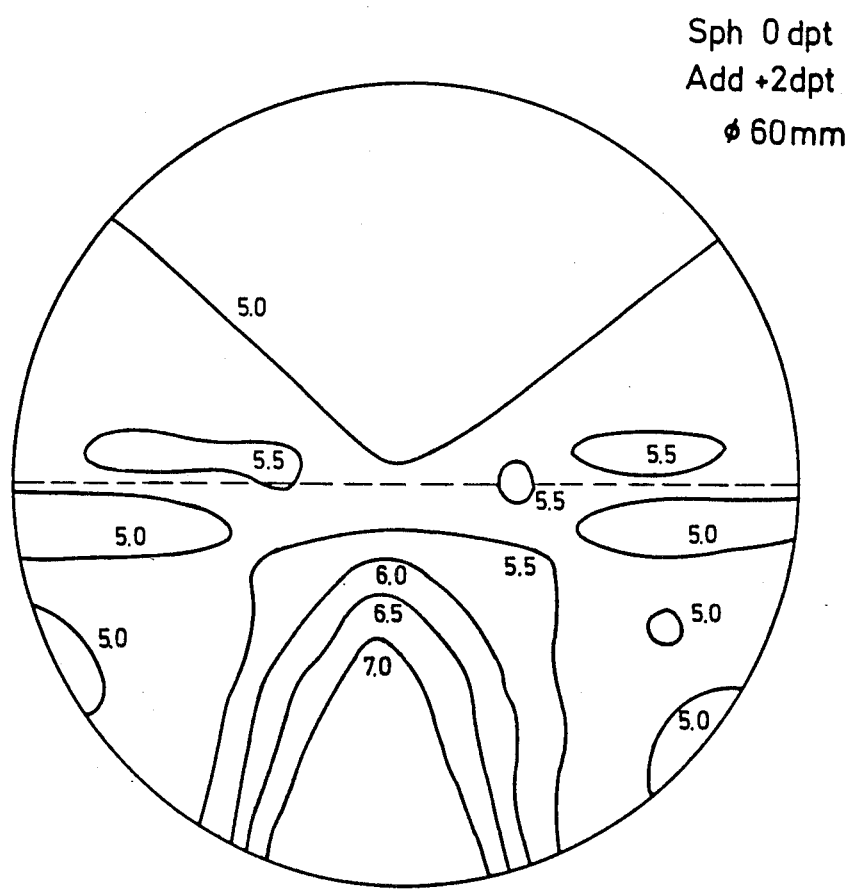
FIG. 6 is a view similar to FIG. 5, but showing lines of constnt average surface dioptric power.

FIG. 6 shows lines of constant average surface power for the progressive surface of the same lens, i.e. of Example I, which in the far-vision zone has a surface power of +5 dpt and in the near-vision zone a surface power of +7 dpt. If one combines this surface with a second lens surface which has a surface power of −5 dpt, on then obtains a spectacle lens of Sph 0 dpt, Add +2 dpt.

It can be seen that the surface power is substantially horizontal-symmetrical to the principal sight line, which extends here from right to left. Laterally of the progressive and near-vision zones it reaches the value of the far-vision zone. The transition of the surface power from the far-vision zone to the near-vision zone along the principal sight line can also be clearly noted.

FIG. 7 shows the course of curvature of intersection lines resulting from the intersections of several horizontal planes with a progressive surface developed on the object side of the lens, the particular lens being one for which the principal sight line extends from right to left, in the sense of FIG. 7. The difference $K - K_{(x=0)}$ of the horizontal curvatures is shown for different horizontal sections. The curvature K is defined in accordance with $K = 1000/\text{radius}$. The curves show this curvature at each point x, the curvature at the point $x=0$, i.e., along the curve 6 in FIG. 1, being in each case subtracted. It can be seen that the course of the surface, particularly in the upper part of the progressive zone 3, is completely new; the curvature first of all increases considerably toward the side and then decreases again.

To further implement description of the Example I embodiment, FIG. 8A charts specific radii at equidistant points along various horizontal sections on the progressive-power surface of the aspheric lens of FIGS. 3 to 7, and FIG. 8B charts specific radii at equidistant points along various vertical sections on the same progressive-power surface, i.e. for the aspheric lens of FIGS. 3 to 7.

EXAMPLE II

By way of further illustrations, FIGS. 9A and 9B chart radii as in FIGS. 8A and 8B, respectively, but for a spectacle lens, in which the progressive-power surface is on the side facing the object and in which power in the far-vision zone is +1.75 dpt, and further in which power in the near-vision zone involves an added +2 dpt, thus making a power of +3.75 dpt in the near-vision zone. In this Example II, maximum thickness is 3.7 mm, the index of refraction (n) is 1.604, and the constant spherical inner-surface radius $R_2$ is 142.12 mm.

What is claimed is:

1. A multi-focal continuous-focus spectacle lens with dioptric power varying progressively between different zones of vision and having a progressive surface which has an intermediate progressive zone between a far-vision zone and a nearvision zone, said surface being aspherical and being based on a non-linear principal sight line which is inclined toward the nose at least in its course through the progressive zone, the curvature of said surface at each horizontal section taken through said lens being substantially symmetrical on opposite sides of the intercept of said each horizontal section with the principal sight line; whereby, for binocular viewing through a suitably corrected pair of such lenses, and whatever the instantaneous horizontal deflection of the eyes to view an object in any of said zones, each eye views the object through its associated spectacle lens via substantially the same lens curvature.

2. A multi-focal spectacle lens with dioptric power varying progressively between different zones of vision and having a progressive surface which has a far-vision zone and a near-vision zone as well as an intermediate progressive zone, said surface being aspherical and being based on a non-linear principal sight line which (i) is vertical in the far-vision zone and (ii) inclines toward the nose in its course through the progressive zone and (iii) is substantially vertical in the near-vision zone, the curvature of said surface at each horizontal section taken through said lens being substantially symmetrical on opposite sides of the intercept of said each horizontal section with the principal sight line; whereby, for binocular viewing through a suitably corrected pair of such lenses, and whatever the instantaneous horizontal deflection of the eyes to view an object in any of said zones, each eye views the object through its associated spectacle lens via substantially the same lens curvature.

3. A multi-focal spectacle lens according to claim 2, in which said substantial symmetry of curvature is within a limit such that horizontal and vertical directional errors do not substantially exceed 0.5 cm/m.

4. A multi-focal spectacle lens with a dioptric power varying progressively between different zones of vision (progressive lens) having a progressive surface which has a far vision zone and a near-vision zone as well as an intermediate progressive zone and which is divided by a principal sight line into a nasal region and a temporal region, characterized by the combination of the following features:

(a) the principal sight line (5) is non-linear, being vertical in the far-vision zone (2) and inclined toward the nose at least in its course through the progressive zone (3);

(b) the far-vision zone (2) is corrected well; the zone of increasing dioptric power commences in its nasal and temporal lower region, the magnitude of astigmatism and focusing error being, however, kept sufficiently small;

(c) in the short progressive zone (3) along the principal sight line (5) astigmatism exists within the scope of a permissible reduction in vision;

(d) the near-vision zone (4) contains a sufficiently wide well-corrected near-vision region which is subtantially horizontal-symmetric with respect to the principal sight line (5);

(e) the distortion passes laterally of the principal sight line (5) in the progressive and near-vision zones (3, 4) into values which approach the distortion of the far-vision zone, the distortion nasally and temporally of the principal sight line (5) being so selected that the horizontal and vertical directional errors do not exceed tolerable values.

5. A progressive lens according to claim 4, characterized by the fact that, over the entire lens, points of the same horizontal distance (x) from the principal sight line (5) and the same height (y) have approximately the same values of astigmatism and focusing error.

6. A progressive lens according to claim 4, characterized by the fact that the dioptric power laterally of the principal sight line (5) in the progressive and near-vision zones (3, 4) approximates the value of the far-vision zone (2).

7. A progressive lens according to claim 4, characterized by the fact that the astigmatism along the principal sight line (5), starting from a value near to zero in the lower region of the far-vision zone (2), reaches a maximum value in the progressive zone (3) and when reaching the near-vision zone (4) has dropped again to a value near to zero.

8. A progressive lens according to claim 4, characterized by the fact that the tolerances for directional errors and distortion are utilized to such an extent that astigmatism is slight and is favorably distributed over the entire lens.

9. A progressive lens according to claim 4, characterized by the fact that intersection of its progressive surface with horizontal planes in the upper part of the progressive zone (3) forms curves the curvature of which, in case of a progressive surface on the object side of the lens, commencing in the vicinity of the edge of the zone of good vision, at first increases considerably in the laterally outward direction and then decreases again.

10. A progressive lens according to claim 4, characterized by the fact that the intersection of its progressive surface with horizontal planes in the upper part of the progressive zone (3) forms curves whose curvature, in the case of a progressive surface on the eye side of the lens, commencing with the vicinity of the edge of the zone of good vision, at first considerably decreases in the laterally outward direction and then increases again.

11. A progressive lens according to claim 4, characterized by the fact that the progressive surface is twice continuously differentiable.

12. A multi-focal spectacle lens with a dioptric power varying progressively between different zones of vision having a progressive surface which has a far-vision zone and a near-vision zone as well as an intermediate progressive zone and which is divided by a principal sight line into a nasal region and a temporal region, characterized by the combination of the following features:

(a) the progressive surface is aspheric in all of said zones;

(b) the principal sight line (5) is non-linear, being vertical in the far-vision zone (2) and inclined toward the nose in its course through the progressive zone (3) and substantially vertical in the near-vision zone (4);

(c) in the short progressive zone (3) along the principal sight line (5) astigmatism exists within the scope of a permissible reduction in vision wherein said reduction does not substantially exceed 0.50 dpt;

(d) the near-vision zone (4) contains a sufficiently wide well-corrected near-vision region which is substantially horizontal-symmetric with respect to the principal sight line (5);

(e) curvature of said surface at each horizontal section taken through said lens being substantially symmetrical on opposite sides of the intercept of said each horizontal section with the principal sight line;

(f) the distortion passes laterally of the principal sight line (5) in the progressive and near-vision zones (3, 4) into values which approach the distortion of the far-vision zone.

13. A progressive lens according to claim 12, characterized by the fact that, over the entire lens, points of the same horizontal distance (x) from the principal sight line (5) and the same height (y) have approximately the same values of astigmatism and focusing error.

14. A progressive lens according to claim 12, characterized by the fact that the dioptric power laterally of the principal sight line (5) in the progressive and nearvision zones (3, 4) approximates the value of the far-vision zone (2).

15. A progressive lens according to claim 12, characterized by the fact that the astigmatism along the principal sight line (5), starting from a value near zero in the lower region of the far vision zone (2), reaches a maximum value in the progressive zone (3) and when reaching the near-vision zone (4) has dropped again to a value near to zero.

16. A progressive lens according to claim 12, characterized by the fact that the tolerances for directional errors and distortion are such that astigmatism is slight and is favorably distributed over the entire lens.

17. A progressive lens according to claim 12, characterized by the fact that intersection of its progressive surface with horizontal planes in the upper part of the progressive zone (3) forms curves the curvature of which, in case of a progressive surface on the object side of the lens, commencing in the vicinity of the edge of the zone of good vision, at first increases considerably in the laterally outward direction and then decreases again.

18. A progressive lens according to claim 12, characterized by the fact that the intersection of its progressive surface with horizontal planes in the upper part of the progressive zone (3) forms curves whose curvature, in the case of a progressive surface on the eye side of the lens, commencing with the vicinity of the edge of the zone of good vision, at first considerably decreases in the laterally outward direction and then increases again.

19. A multi-focal lens according to claim 12, in which along the principal sight line and at least in the progressive zone, there exists at least some astigmatic error.

20. The spectacle lens of claim 12, wherein the lens material is glass and said one lens surface is a machined surface.

21. The spectacle lens of claim 12, wherein the lens material is organic and said one lens surface is a molded surface.

22. The method of embodying continuous-focus features in a progressive zone between a far-vision zone and a near-vision zone of a spectacle lens, which method comprises adopting a principal-sight line which is inclined toward the nose at least in the progressive zone, said line dividing the lens between a nasal region and a temporal region, individually calculating local surface data for desired local optical properties at each of a plurality of locations over the lens surface, the calculations being such as to provide horizontal symmetry of said optical properties at points of the nasal region and the temporal region which correspond to each other with respect to binocular viewing, said properties being especially so calculated that the horizontal and the vertical directional error at said corresponding points do not exceed tolerable values, calculating a single lens surface from said individually calculated local surface and in such manner that said calculated single lens surface is twice continuously differentiable at each point in the surface, and then generating said calculated single lens surface in a machine operation.

23. The method of embodying continuous-focus features in a progressive zone between a far-vision zone and a near-vision zone of a spectacle lens, which method comprises adopting a non-linear principal-sight line which is (i) vertical in the far-vision zone, (ii) inclines toward the nose in the progressive zone, and (iii) is substantially vertical in the near-vision zone, said line dividing the lens between a nasal region and a temporal region, individually calculating local surface data for desired local optical properties at each of a plurality of locations over the lens surface, the calculations being such as to provide horizontal symmetry of said optical properties at points of the nasal region and the temporal region which correspond to each other with respect to binocular viewing, said properties being especially so calculated that the horizontal and the vertical directional error at said corresponding points do not exceed tolerable values, calculating a single lens surface from said individually calculated local surface and in such manner that said calculated single lens surface is twice continuously differentiable at each point in the surface, and then generating said calculated single lens surface in a machine operation.

* * * * *

UNITED STATES PATENT AND TRADEMARK OFFICE
CERTIFICATE OF CORRECTION

PATENT NO. : 4,606,622

DATED : August 19, 1986

INVENTOR(S) : Gerhard Fuerter and Hans Lahres

It is certified that error appears in the above-identified patent and that said Letters Patent is hereby corrected as shown below:

On face of patent:

At "[19]" -- Correct spelling of inventor's name from "Fuëter et al" to -- Fuerter, et al.--

At "[75]" -- Correct spelling of inventor's name from "Gerhard Fuëter" to -- Gerhard Fuerter --

Signed and Sealed this

Twenty-fourth Day of February, 1987

Attest:

DONALD J. QUIGG

Attesting Officer     Commissioner of Patents and Trademarks